(12) United States Patent  
Ichino

(10) Patent No.: US 7,713,060 B1  
(45) Date of Patent: May 11, 2010

(54) JOINING MECHANISM FOR LIGHTWEIGHT APPLICATIONS

(76) Inventor: Ted Ichino, 203 N. Lucia Ave., #4, Redondo Beach, CA (US) 90277-3214

( * ) Notice: Subject to any disclaimer, the term of this patent is extended or adjusted under 35 U.S.C. 154(b) by 169 days.

(21) Appl. No.: 12/008,816

(22) Filed: Jan. 14, 2008

Related U.S. Application Data

(60) Provisional application No. 60/897,071, filed on Jan. 23, 2007.

(51) Int. Cl.
*G09B 23/04* (2006.01)

(52) U.S. Cl. .................. 434/211; 446/112; 446/487; 403/171; 403/176

(58) Field of Classification Search ........... 403/171, 403/176; 434/211, 277; 446/108, 109, 111, 446/112, 115, 487
See application file for complete search history.

(56) References Cited

U.S. PATENT DOCUMENTS

| | | | | |
|---|---|---|---|---|
| 3,120,078 | A * | 2/1964 | Bessinger | 446/112 |
| 3,827,177 | A * | 8/1974 | Wengel | 446/112 |
| 3,987,580 | A * | 10/1976 | Ausnit | 446/115 |
| 4,792,319 | A * | 12/1988 | Svagerko | 446/104 |
| 6,176,757 | B1 * | 1/2001 | Lin | 446/115 |
| 6,186,855 | B1 * | 2/2001 | Bauer et al. | 446/104 |
| 6,565,406 | B2 * | 5/2003 | Huang | 446/104 |
| 7,438,623 | B2 * | 10/2008 | Lin | 446/108 |

OTHER PUBLICATIONS

H.M. Cundy & A.P. Rollett, Mathematical Models, Oxford University Press, Great Britain, 1966 flyleaf: 1-4; p. 13: 4-9; p. 14: 1-2; 8-11 p. 15: 14-22; p. 16: 6-13.
Alan Holden, Shapes, Space, and Symmetry, Columbia Unversity Press, USA 1971 preface: 16-19; p. 188: 1-4; p. 190: 1-10.
Jay Kappraff, Connections, the Geometric Bridge between Art and Science, McGraw-Hill, Inc., USA, 1991 p. 329: 5-7.
Anthony Pugh, Polyhedra a visual approach, University of California Press, USA, 1976 p. 1: 12-13; p. 33: 4-11; p. 108: 2-7, 9-14; p. 110: 3-16, 18-19, 29-35 p. 111: 1-2, 3-8, 9-17, 18-31; pp. 115: 1-7.
Magnus J. Wenninger, Polyhedron Models, Cambridge University Press, USA, 1975 p. 1 col. 1: 9-14, 22-24, 30-34, 36-39, 40-44 p. 1 col. 2: 8-13, 18-27 p. 2 col. 1: 11-18 p. 3 col. 1: 3-11, 17-20 p. 3 col. 2: 1-3.

* cited by examiner

*Primary Examiner*—Michael P Ferguson

(57) ABSTRACT

A convex polyhedron is formed from planar polygonal members, wherein aligned sides of adjacent abutting polygonal members meet to form edges of the polyhedron. A flexible polycarbonate plastic joining tab fits into slots in the centers of sides of adjacent polygonal members to enable adjustment of the dihedral angle between the adjacent polygonal members. A supplemental source of support such as hook and loop strips are used to fasten joined polygonal members securely in place at a desired alignment and dihedral angle. The polygonal members have mirrored interior faces which impart infinite internal reflections within an interior of the polyhedron, wherein one of the polygonal members is a two-way transparent mirror serving as a viewport, allowing a user to see into the infinitely-reflective interior of the polyhedron.

6 Claims, 5 Drawing Sheets

JOINING MECHANISM FOR LIGHTWEIGHT APPLICATIONS

CROSS-REFERENCE TO RELATED APPLICATIONS

This application claims the benefit of provisional patent application Ser. No. 60/897,071 filed 23 Jan. 2007 by the present inventor.

SEQUENCE LISTING

None.

BACKGROUND OF THE INVENTION

1. Field of the Invention

This invention pertains to joining and fastening mechanisms, especially for lightweight applications such as toys. The present invention resulted from a need to conveniently and securely attach polygons to each other in order to construct convex uniform polyhedra, the five regular polyhedra (Platonic solids) and the thirteen semi-regular polyhedra (Archimedean solids) being of particular interest.

Nomenclature:

The following descriptions and nomenclature have been excerpted from *Polyhedron Models* by Magnus J. Wenninger (pp. 1-3):

"[A] plane figure may be defined as a set of line segments enclosing a portion of two-dimensional space. Such a plane figure is called a polygon. A polyhedron is then defined as a set of plane figures enclosing a portion of three-dimensional space . . . . [T]he ideal polygons are regular, that is, they have all sides and all angles equal. The simplest regular polygon is the equilateral triangle . . . . [Along] [w]ith the equilateral triangle the following polygons enter the picture: the square (four sides), the pentagon (five sides), the hexagon (six sides), the octagon (eight sides) and the decagon (ten sides), all of course only as regular polygons.

"[T]he five regular solids . . . each . . . has regular polygons of the same kind for all its faces. They are known today as the five Platonic solids. The tetrahedron, which has four equilateral triangles for its faces . . . is the simplest polyhedron, since it has the least number of faces possible to enclose a portion of three-dimensional space . . . . The hexahedron (six faces), commonly called the cube, has squares; the octahedron (eight faces) again has equilateral triangles; the dodecahedron (twelve faces) has all pentagons; and finally the icosahedron (twenty faces) has twenty equilateral triangles.

"There is another set of solids known as the Archimedean or semi-regular solids. These all have regular polygons as faces and all vertices equal but admit a variety of such polygons in one solid. There are thirteen such solids and they are ascribed to Archimedes because he first enumerated them, although his work on them has been lost.

"The union of these two sets, the Platonic and the Archimedean solids, together with the two infinite sets of prisms and anti-prisms, yield the set known as the convex uniform polyhedra. A polygon is convex if no interior angle is greater than 180 degrees. Analogously a polyhedron is convex if no dihedral angle (formed by the intersection of two faces with its vertex on or in an edge) is greater than 180 degrees . . . . In a uniform polyhedron the polygons around any vertex occur in the same order [as] in any other vertex. For example in the rhombicosidodecahedron the order going around a vertex is: a triangle, a square, a pentagon, and another square. The same holds true at every vertex.

"Just as in a polygon two sides meet at a point called the vertex of the figure, so in a polyhedron two faces meet at or on a line (or in a line—the mode of expression is variable). Thus each face shares one of its sides as a line in common with another face. These lines are called the edges of the polyhedron. So each edge of a polyhedron belongs to exactly two faces and no more. The edges all meet at a point called a vertex of the polyhedron."

Traditional methods of joining two objects together proved to be cumbersome and inadequate when applied to aligning and holding two or more regular polygons in place, and a new method that would easily and naturally allow two or more polygons to be interconnected without the limitations of the traditional approaches had to be devised.

The Prior Art uses adhesives or tape to permanently bond two polygons together. Gluing two polygons together at a desired angle is difficult, and persuading the polygons to retain this angle while the glue sets is challenging. Taping them together such that they meet at a specific dihedral angle is even harder. The Prior Art limits itself to attaching two polygons together, thereby ignoring a much simpler and more effective way to construct polyhedra from component polygons. Three or more polygons (depending on how many polygons surround a given vertex of a convex uniform polyhedron under construction) will align themselves at the correct dihedral angles if their sides are lined up to form edges, and these edges will automatically converge at a single vertex. The present invention allows a plurality of polygons to easily and conveniently be hooked together and to readily be adjusted relative to each other.

The present invention describes a joining mechanism that allows three or more polygons to easily be linked together and manipulated such that they align themselves correctly and converge on an optimal dihedral angle. By allowing three or more polygons to be quickly and easily linked together and adjusted, the present invention removes much of the tedium and difficulty from the construction of polyhedra. Although much of the description that follows concerns itself with describing how two polygons are to be conveniently linked together, construction of polyhedra is vastly expedited when three or more polygons (rather than only two polygons) have been linked together.

Wenninger, quoted above, says, "In a uniform polyhedron the polygons around any vertex occur in the same order [as] in any other vertex." Linking "the polygons around any vertex" together and adjusting their faces such that their sides meet cleanly to form edges will cause the polygons to settle into a configuration where they are arranged at correct dihedral angles. For the rhombicosidodecahedron, four polygons must be linked together before they will naturally assume the desired orientation: "a triangle, a square, a pentagon, and another square."

Consider the construction of a cube. As taught by the Prior Art, two squares can be roughly glued into a right angle and left to dry, but this angle will probably need to be adjusted later. Although there is only one way to line up the sides of two squares to create an edge, once this edge has been formed countless dihedral angles between the two faces are possible. Even with the constraint that the two sides must align to form an edge, there are still too many degrees of freedom. However, imagine what would happen if the three polygons around a vertex of a cube were to be loosely bound together, leaving room for adjustment. This would entail hooking three squares together such that any edges formed will converge into a vertex. The simple act of aligning the sides of such hooked-together squares into edges not only enforces 90-degree dihedral angles, it also ensures that all three faces come together to meet cleanly at a single point (the vertex). All guesswork has been removed; the polygons virtually align themselves. There is only one way that the three squares can fit together: they must form half of a cube.

The Prior Art does not mention that multiple polygons, when correctly joined, have a propensity to settle into a correct mutual alignment. The Prior Art accordingly makes no provision to take advantage of this inclination. Because it lacked the convenience of a joining mechanism that quickly and easily allows multiple polygons to quickly and easily be mutually interconnected and because its methods are unforgiving and exacting, the Prior Art restricted itself to combining two polygons, thereby making the creation of polyhedra from component polygons more difficult and tedious than it needed to be.

Ideally, a joining mechanism is easy to use and forgiving; it allows various pieces to be easily joined together; it allows the dihedral angle described by the faces of two joined polygons to be easily adjusted; it ensures that the sides of the joined polygons will form an edge by meeting cleanly in a line; and it allows pieces that have been joined together to be readily disassembled. For the purposes of constructing polyhedra, an ideal joining mechanism would be strong, durable, lightweight, extremely flexible and would provide a measure of lateral stability. An ideal joining mechanism would have no sharp edges that could pose a safety hazard and would have a great deal of spring action, bending through a wide range of motion without suffering permanent deformation.

Thin strips of polycarbonate plastic with a thickness of 0.030"+/−0.025" proved to be well suited for use as joining strips, or tabs, whose intended purpose is to connect and align polygons. Polycarbonate strips, or tabs, can be easily bent to a given angle and, if creased, they tend to hold this angle and will preferentially bend at the crease. A width of roughly ³⁄₁₆" worked well, but the width of a tab is not particularly critical, except as noted below. The width of a polycarbonate plastic tab allows it to act as a hinge that keeps the sides of two joined polygons lined up and in contact with each other. Thus, the dihedral angle between two polygons (e.g., equilateral triangles) that have been joined by means of a polycarbonate plastic tab can readily be adjusted simply by rotating the vertices of the two triangles closer together or farther apart, allowing the tab to act as a hinge. A thickness of approximately 0.030" provides a good balance between strength and flexibility: a tab that is too thin will be weak and floppy, while a tab that is too thick will be hard to bend and difficult to cut.

In order to join two objects together, a tab must first be secured, or affixed, to the joined objects. A slot that is 0.006"+/−0.004" thicker than the thickness of a tab works well. If the slot is thinner, the tab is likely to bind; if the slot is thicker, the fit becomes sloppy. At least one slot that accommodates a polycarbonate plastic tab must be present on each piece that is to be joined. This slot can be cut or gouged directly into the pieces that are to be joined, or can alternately be created by gluing a shallow U-shaped channel to these pieces. Should a firmer join be desired, an incision can be made into the end of a joining strip, resulting in the creation of a secondary spring that will hold the joining mechanism more firmly in place. The maximum width of a given tab is thus determined by the width of the slot that it slides into—ideally all of the slots will share an identical width, which in turn will allow the tabs to have a fixed width that is slightly narrower than the width of a slot.

Consider a slot located in the center of a side of a regular polygon, with a tab partway inserted into the slot. The protruding portion of the tab will allow the polygon to be joined to any other polygon that has a side with a corresponding slot in its center. By sliding part of the tab into one slot and the remainder of the tab into another slot, the sides of the polygons containing the slots will be joined. By centering the slots, any two sides having identical lengths can be connected via a tab; the number of sides a polygon contains is irrelevant. A three-sided polygon can be joined to a four-sided polygon or an eight-sided one; the number of sides is irrelevant. Non-regular polygons can similarly be joined to either regular polygons or non-regular polygons, provided that a slot capable of accepting a tab can be found in the center of every side that is to be joined to another polygon, and that the joined sides have the same length.

Tabs alone do not provide sufficient cohesive power to act as a fastening means that securely hold polyhedra together. Tabs make good connectors, but if nothing holds them in place, they can slide out of the slots that they have been inserted into. There are many ways to increase the intensity with which tabs join two polyhedra together. The easiest way would be to glue the tabs into place. Alternatively, a ridged slot coupled with a tab with barb-like projections that fit into these ridges would impart a ratchet-like quality that makes the tab easier to insert than to extract, resulting in a preferentially one-way action. Unfortunately, the tighter the tabs hold the polygons together, the harder a completed polyhedron will be to disassemble, and reusability of the component polygons is an essential feature of the present invention. A way to fasten polygons securely together while allowing them to later be unfastened and disassembled is needed.

If tabs are used as a joining mechanism or connecting means that serves primarily to properly align and position the component polygons while Velcro hook and loop is used in conjunction with the tabs to hold the polygons in place, the desired fastening means of the previous paragraph is achieved, and construction of convex polyhedra is greatly facilitated. A tab enables a polygon to be quickly attached to a partially-completed polyhedron and to be rapidly and accurately positioned, while one or more strips of Velcro hook and loop hold the faces of the polygon firmly held in place. Tabs, used in conjunction with Velcro hook and loop, thus become a means of securely fastening two polygons together. By limiting the amount of "play" between the component polygons, Velcro hook and loop ensures that a completed polyhedron will be acceptably stable and rigid. In addition, should any section of a polyhedron prove to be too loose, the Velcro in the loose area can selectively be detached and re-tightened without requiring disassembly of the entire polyhedron or disarranging the rest of the polyhedron.

Velcro alone will not yield the desired results. If Velcro is applied without using tabs, there is nothing to ensure that the polygon sides will meet cleanly into edges—and the tighter the Velcro is wrapped, the more the polygon faces will tend to pop out of alignment. In the interests of interoperability and universality, polygons should not have beveled sides; instead, their sides should be cut square to their faces. The dihedral angle between two polygon faces will then cause the sides of two polygons to meet along what is essentially a knife-edge. Without a stabilizing influence to maintain the polygons in this unstable relationship, the polygons will tend to pop out of this edge-to-edge relationship and assume a more stable but less aesthetic configuration.

Tabs alone will not yield the desired results. Although they align the polygons and facilitate easy positioning and adjustment, without supplementation they will not hold the positioned polygons in place. Tabs alone do not provide sufficient restrictions on the range of movement of the joined polygons; a means of tensioning or securing the polygons in the desired position is also needed. Thus, once the tabs have served their main purpose of allowing the polygons to be properly positioned relative to each other, Velcro hook and loop (or an equivalent) must then be applied if the polygons are to maintain this position. Velcro serves as a supportive means and with the tabs still in place, the polygon edges are prevented from shearing or skewing under the tensional pressure of the Velcro. Substances other than Velcro could also provide support; e.g., tape or Post-Its.

Any convex polyhedron can be constructed using the joining/fastening mechanism described in the present patent; the method is not restricted to the construction of Platonic and Archimedean solids. Specifically included are the non-Platonic convex deltahedra, as well as polyhedra containing non-regular polygon faces (e.g., the triakis tetrahedron, whose faces are comprised of isosceles, rather than equilateral, triangles, or the pentagonal icositetrahedron, whose faces are irregular pentagons). As long as a slot exists in the center of each side that is to be joined and tabs to fit into said slots are available, any two polygons with sides of the same length can be joined together. Velcro will lock the dihedral angle in place once the polygons have been properly positioned. Polygons whose sides are of dissimilar lengths can also be joined; however, the resulting figure will not "enclose a portion of three-dimensional space."

Convex polyhedra have fascinated mathematicians throughout the ages: Euclid, Kepler, Archimedes and Euler have all examined convex regular and semi-regular polyhedra and described their properties. The shapes are clean and simple, with a mathematical elegance that pleases the eye. Buckminster Fuller, in his book *Synergetics*, describes how the various Platonic (regular polyhedra) solids fit together, and devotes much space to their characteristics and properties (particularly of the tetrahedron).

The Prior Art uses adhesives to permanently bond two polygons together, precluding component polygons from being reused. As a result, the Prior Art teaches the use of inexpensive building stock such as cardboard, and costlier materials are not considered. However, a convex polyhedron whose internal faces are made from "one-way" mirror (i.e., fully silvered, opaque, standard, normal mirror) is potentially far more interesting than one whose internal faces have been made of cardboard. If component polygons have been cut from one-way mirror and a polyhedron is constructed from these polygons such that all of the mirrored faces are located in its interior (in effect, silvering the interior of the polyhedron and rendering all of its internal faces reflective), the polyhedron will then exhibit infinite internal reflections.

Unfortunately, when 100% of the faces of a polyhedron have been made of one-way mirror, there will be no way to easily view these internal reflections. However, if a face of the polyhedron were to be replaced with a polygon of the same shape that is wholly or partly composed of "two-way" mirror (i.e., half-silvered mirror, sometimes called "transparent mirror" or "see-thru mirror") and the interior of the polyhedron were then to be brightly illuminated, its infinite internal reflections could be readily viewed using the two-way mirror as a viewport. Multiple faces could be replaced with "two-way" mirror, allowing the polyhedron to function as a nightlight when its interior is brightly lit and it is in darkened surroundings. Two-way mirror is not as reflective as one-way mirror; it allows some light to escape. If one wishes to see the internal reflections of a polyhedron as clearly as possible, the surface area of the polyhedron that is composed of two-way mirror should be kept to a minimum (while still allowing as full a field of view into the interior of the polyhedron as is practical or feasible).

Note: The alternate names for two-way mirror were taken from the best-known brand of glass two-way mirror (Mirrorpane™ Transparent Mirror) and a brand of plastic two-way mirror (See-Thru Acrylic Mirror).

Two-way mirror operates on a light differential: a two-way mirror will appear to be a window when viewed from the dimly lit side, but will appear to be a mirror when viewed from the brightly lit side. If the light differential is not pronounced enough, a two-way mirror can exhibit both behaviors simultaneously, if somewhat indistinctly. The most familiar example of a two-way mirror is a police interrogation room: on one side of the mirror is a dimly-lit observation room; on the other side is the brightly-lit interrogation room. From the observation room, the two-way mirror appears to be a window, yet from the interior of the interrogation room it appears to be a normal mirror.

2. Description of Related Prior Art

Prior Art—Joining Mechanisms:

The Prior Art consists of piano wire encased in aluminum tubing of a slightly larger diameter (generally, 0.003" larger than the diameter of the piano wire). The tubing is cut to size and affixed to the various pieces to be joined together; the piano wire is cut to the desired length; and these lengths are then inserted into the tubing and bent to the appropriate angle. The disadvantages of this approach are as follows:
  piano wire prefers to permanently deform when bent;
  once bent, piano wire is difficult to straighten;
  piano wire lacks springiness;
  the circular cross-section of piano wire combined with the circular cross-section of the aluminum tubing in which it resides provides an unwelcome degree of rotational freedom;
  the lengths of piano wire have sharp ends that can puncture the skin;
  it is difficult to cut piano wire to the desired length;
  the ends of the piano wire often get burrs when the piano wire is cut;
  if dirt or grit gets into the aluminum tube that the piano wire fits into, it can become difficult to insert the piano wire into the tube;
  if dirt or grit gets into an aluminum tube that a piano wire has been fitted into, the piano wire becomes prone to binding;
  the aluminum tubing is easily deformable, being thin-walled and made from soft aluminum;
  the aluminum tubing is difficult to cut;
  the aluminum tubing deforms easily when being cut;
  it is difficult to insert piano wire into a deformed aluminum tube;
  it is difficult to reposition pieces that have been joined with aluminum tubing and piano wire.
  polygons joined with aluminum tubing and piano wire do not possess a hinging action and thus lack a preferred plane of stability.

Another traditional approach is to use thin flexible spring-steel strips as connectors. However, the shorter the length of the steel strip, the stiffer the spring action. For example, stiffening an automobile leaf spring by cutting it to a shorter length is a strategy well known to the Prior Art. Therefore, if short steel strips are to be employed to join regular polygons together, they need to be thin if they are to have the requisite flexibility. However, the knife-like edge resulting from this thinness constitutes a safety hazard, particularly when the strips are to be used as part of a toy. Additionally, steel is opaque, and, especially for the viewport, a transparent material is preferable. Lastly, a polycarbonate plastic tab can be bent through a far wider range of motion than a corresponding steel strip; furthermore, a polycarbonate plastic tab will be far more difficult to permanently deform than a steel strip, and once deformed, can be readjusted far more easily than steel. Polycarbonate plastic is easier to cut and can be cut with less distortion than thin steel; polycarbonate plastic connectors, or tabs, lie flat and have minimal imparted waviness or curvature. The disadvantages of using spring steel connectors are as follows:

- steel strip connectors must be thin in order to have the requisite flexibility, and this thinness imparts knife-like edges;
- steel strip connectors permanently deform far more readily than polycarbonate plastic tabs;
- once deformed, steel strip connectors are more difficult to straighten out than polycarbonate plastic tabs;
- steel strip connectors are difficult to cut, compared to polycarbonate plastic;
- steel strip connectors deform when cut, compared to polycarbonate plastic;
- steel strip connectors are opaque, compared to polycarbonate plastic;
- steel strip connectors are subject to corrosion.

The nave approach of using tape to affix polygons to one other suffers from the limited flexibility and limited adjustability of the taped join. The faces of convex polyhedra must meet at specific angles and if tape is to be used, the initial dihedral angle must be fairly accurate. Taping the polygon faces loosely together to allow a degree of adjustment will often allow the polygons to be arranged such that their ideal dihedral angles start to become apparent, but the polygons must then be adjusted and re-taped to remove the slack from the system. A polyhedron held together solely by tape is subject to sudden collapse, since the failure of a single tape join puts extra stress on the surrounding tape joins, often resulting in a cascade of failed joins. Tape requires a clean surface to adhere to, and can leave a tacky residue on the taped surfaces if left in place too long. Tape by itself does not directly aid in the positioning of polygons; at best, it only serves to hold the polygons in place once they have been correctly positioned. Note that when a tab is present and the join is tightened, the tab will keep the two sides of the polygon in line and prevent the sides from skewing. When tabs are not used, nothing actively ensures that the sides of the component polygons will stay correctly positioned, and tightening one side of the polyhedron will often cause another area to lose its alignment.

Additional Prior Art concerning joining mechanisms will be presented below, in the Polyhedra Models section.

Prior Art—Polyhedra Models:

Prior Art for constructing polyhedra can be found in *Shapes, Space, and Symmetry* by Alan Holden, *Polyhedron Models* by Magnus J. Wenninger, *Mathematical Models* by H. M. Cundy and A. P. Rollett, and especially in *Polyhedra a visual approach* by Anthony Pugh. Jay Kappraff, in *Connections, the Geometric Bridge Between Art and Science*, does not describe how to construct polyhedra, instead referring the reader to the above-mentioned works by Holden, Wenninger, Cundy & Rollett, and Pugh.

The Prior Art teaches methods that do not permit disassembly of a polyhedron into its component polygons—the polygons are permanently adhered to one another.

Holden teaches that the sides of the component polygons are to be glued directly together:

"The faces are usually best assembled first in pairs. A little white glue is squeezed out of its squeeze-bottle to form a small pool on a 3"×5" file card. A toothpick is dipped in the glue and used to smear one side of a polygonal face. The side of the face to be attached is pushed against the glue-bearing side and slid along it to distribute the glue. The pair is then placed on a table with the glued joint standing up. More such joints are made, and after a few minutes the first-made joint has set sufficiently to permit further work with the pair. For several hours the joint remains sufficiently flexible to permit adjustment of the dihedral angle. [p. 190]

"In making an octahedron, the appropriate sides of one such pair of triangles are smeared with glue, and the two pairs to be joined are slid toward each other along a flat surface, to form a square pyramid. Two square pyramids are later joined at their bases to complete the octahedron . . . ." [p. 191]

Wenninger prefers to use tabs that are integral to the polygon faces (unlike the tabs of the present invention, which have no intrinsic connection to a polygon):

"[T]abs will be used for cementing the parts together . . . . A good household acetone cement provides the best adhesive since it is quick drying and adheres very firmly. The procedure is to apply the cement all along one tab, then to join the tab from another part to it, to move these parts back and forth slightly to help spread the cement evenly on both parts, then to maneuver the parts into accurate positions before the cement becomes too stiff. [pp. 12-13]

"You will find that the method of assembly for polyhedron models suggested here will generally give you fairly rigid results, since the tabs serve as interior structural ribs along all the edges of the model . . . . For all the convex polyhedra it is best to leave all the tabs." [p. 13]

Pugh prefers the use of tape or glue, but applied as permanently as possible:

"First, the tape should run the whole length of the joint . . . . Second, the tape must be made to adhere as firmly as possible. Finger pressure is not sufficient. [p. 110]

"Of all the glues and adhesives the author has tried, he finds contact cement the most satisfactory . . . the glue is very tenacious." [p. 111]

Cundy and Rollett enumerate a number of adhesives and solvents (ethylene dichloride and acetone can actually melt plastic, fusing two pieces into a single piece):

"Adhesives are legion. Quick-drying cements like Balsa cement or clear 'Bostik' are most useful; so are impact adhesives such as 'Evostik' or the epoxy resins such as 'Araldite.' 'Durofix' is best for celluloid, or use a solvent such as amyl acetate; for 'Perspex', use ethylene dichloride, or the cement supplied by the manufacturers. Nail-polish remover (acetone) can also be used for some plastics. Glass is awkward to cement, though Canada balsam or glass cement can be used." [p. 16]

None of these authors describe a method that would allow component polygons to be reused; once a model is glued together, its edges are stuck together permanently. The inability to reuse component polygons leads to an emphasis on cost-saving or the use of inexpensive cardboard:

Pugh, in *Polyhedra a visual approach* says:
> "Model-building is not an expensive operation, since the tools and materials can be found in most homes and offices, or can be bought inexpensively from neighborhood stores. Very attractive models can be made from scrap material like old cartons; the only constraint is the builder's imagination. [p. 108]"

Cundy and Rollett, in Mathematical Models say:
> "Material suitable for flat sheets can be obtained from backs of old exercise books, manilla [sic] filing folders, cartridge paper, plain postcards, or pasteboard in various thicknesses. An obliging, printer may be able to supply offcuts. More durable sheets can be made of sheet metal, cut from old tins and cans, hardboard, or plywood.... Glass, celluloid, and 'Perspex' have the advantage of transparency; polythene sheeting can now be bought fairly cheaply. [p. 15]"

Wenninger only mentions cardboard in a couple of brief references. All of the models in his book were constructed from cardboard:
> "A little experimenting with cardboard figures will soon lead you to see the reasoning behind a formal proof. [p. 1]
>
> "It is now a simple and easy matter to multiply copies of the parts any number of times. This is done by placing the template on top of a number of sheets of card. It is best to staple the sheets together. Usually four, five or six parts are your requirements at any one time and this will then be the number of sheets of card, say one of each colour needed, that you may staple together. [p. 12]"

Holden, in *Shapes, Space and Symmetry* is equally terse, and he also uses cardboard:
> "The solids pictured in this book were all assembled from individually cut flat faces. Suitable cardboard is of the sort used for mounting photographs, and suitable glue is a "white glue" of the sort exemplified by "Elmer's Glue-all." [p. 188]"

Because the ultimate result of these methods for constructing polyhedra is figures that cannot be disassembled, cost is more of a consideration than it would be if the component polygons could be recovered and reused. Even had high quality plastic mirror been available in the 1970s when these books were written, its cost would have prevented it from being mentioned as a candidate building material.

Neither Holden nor Wenninger make any provision for guide strips that aid in the positioning of the component polygons relative to each other. Holden's advice is to allow the bead of white glue to set up long enough to allow the joint to be worked and then to adjust the dihedral angle before the joint becomes rigid, while Wenninger avoids the topic completely. Neither Holden nor Wenninger mentions the possibility of constructing convex polyhedra from polygons possessing reflective faces that would confer the property of infinite internal reflectivity when the reflective faces are located internally.

Anthony Pugh's book, *Polyhedra a visual approach*, offers much more detailed instructions for building polyhedra. Because of its comprehensiveness, large passages have been excerpted, and comments added in square brackets [emphasis also added]:
> "Joining the Faces
>
> It is usually quickest to join faces with a suitable tape. The adhesive on ordinary Scotch Transparent Tape tends to dry out, especially on absorbant material, thus allowing the model to disintegrate. Scotch Magic Transparent Tape, however, has a much more durable adhesive and has the additional advantage of being almost invisible if applied carefully. Generally, a model tends to look neater if the tape is hidden inside it, but tape can also form an attractive external feature. Drafting or masking tape does not split or tear as easily as the transparent tapes, and it joins faces firmly if applied carefully. It is not as elegant as the other tapes, but that does not matter if the taping is done on the inside of the model. Tapes with a backing of cloth or plastic make very strong joints, but they are relatively expensive . . . . [p. 110]

[In the discussion above, Pugh cites several limitations of tape. Using the wrong type of tape will shorten the lifetime of a cardboard model. Transparent varieties of tape are prone to splitting and tearing, but sturdier types of tape are more expensive. An opaque variety of tape is often not as aesthetically pleasing as a transparent variety.]
> "In making a good, strong joint, the method of applying the tape can be as critical as the tape itself. First; the tape should run the whole length of the joint, as shown in Diagram A3.2a, rather than stopping short, as in Diagram A3.2b. It is not worth trying to economise on tape that way, since it' considerably weakens the model. Any excess tape can be trimmed off afterwards with a razor blade. [p. 110]

[This admonition is only necessary because the tape is single-handedly both aligning the faces and maintaining this alignment. If the joining mechanism of the present invention had been used, a tab would primarily bear the brunt of aligning the sides of the polygons into edges, and keeping the edges from shearing or twisting. The edges of a model would still require a bit of tape to stabilize the faces and hold them in place, but far less tape would be required and it would not need to be applied as forcefully.]
> "Second, the tape must be made to adhere as firmly as possible. Finger pressure is not sufficient. It is a good idea to press the tape down firmly with the cap of a ball-point pen or the handle of a knife, to squeeze out any air bubbles and to ensure as much contact between the tape and the card as possible. [p. 110]

[Pugh cites more limitations of tape: finger pressure is insufficient to create a stable model. Because the tape is serving double-duty—both aligning and holding the faces in place—one has to apply a lot of force in order to get it to adhere sufficiently. Tape is not particularly convenient to use as a joining mechanism when used by itself.]
> "As an alternative to tape, one can join the faces with tabs. One method is to leave margins around each face, as at left in Diagram A3.3. The tabs can then be glued to the undersides of adjacent faces. Since only one tab is needed for each edge of the polyhedron, the model maker must determine where tabs are needed and where they are not. An alternative is to form a tab against every edge and then glue the tabs together, as shown at right in Diagram A3.3. Besides being easier to work out, such a joint forms an internal ridge which strengthens the model. [pp. 110-111]
>
> "Another way of joining faces is to cut them out without tabs and then make a set of hinged tabs from a separate sheet of material, as in Diagram A3.4. By applying contact cement to all surfaces to be joined, one can assemble such a model very rapidly. Further, the hinged tabs reinforce the edges, thereby strengthening the model. [p. 111]

[Here, Pugh describes cardboard hinges that are basically rectangular pieces of cardboard that have been folded in half lengthwise. Note that Pugh uses a cardboard hinge to impart a preferred axis of rotation to a given face of a polyhedron; the ability to adjust the dihedral angle between two faces while keeping said faces aligned on an edge is a desirable characteristic when one is constructing polyhedra. Pugh's hinged tabs, even with their limitations, allow for rapid assembly of polyhedra: Pugh recognized the convenience and superiority of this method of construction yet never carried it to its logical conclusion. The present invention uses a polycarbonate plastic tab to achieve the functionality of one of Pugh's hinged tabs, and a crease in the tab creates a preferred flex point that localizes the hinging action of the strip. However, the present invention's tab is designed to function without adhesives, thus allowing joined pieces to readily be repositioned and also allowing subsequent disassembly of a finished polyhedron.]

"Glues

Of all the glues and adhesives the author has tried, he finds contact cement the most satisfactory. This adhesive is applied to both surfaces and let dry, after which the surfaces are pressed together, to bond on contact. The model builder must exercise care to align the two pieces correctly, as the glue is very tenacious. The glue does not cause the paper to wrinkle. Since the parts bond instantaneously, clamps and clips are not needed to hold them together while the glue sets. [p. 111]

[Pugh cites a major limitation of contact cement: all pieces must be correctly aligned before them can be brought into contact with one another. Once they touch, the parts bond instantly. Perfectly aligning a face before allowing it to contact any side to which it is to be bonded is not easy, and recovery from a misalignment is difficult. Pugh's hinged tabs make the alignment somewhat easier: a hinged tab can be affixed securely to the first polygon, and then only the tab need be positioned and adhered to the second polygon. The hinging motion of the tab makes it somewhat easier to position than a tab that is integral to a side of a polygon.]

"The Last Piece

If a model is constructed with tabs or tape on the inside, a problem will arise in affixing the last face. This problem will be less serious if the last face is a small one. For example, in making a truncated cube, which has eight triangular and six octagonal faces, the problem of affixing the last face is less pronounced if the last face is a triangle than if it is an octagon. Sometimes the natural springiness of the tab or tape can create enough pressure to bond the last piece into position, and sometimes a thin blade such as a palette knife can be slipped underneath it to apply the necessary pressure. Another possibility is to put contact cement round all the edges and glue the last piece into position. If all else fails, the last face can be taped into position on the outside with Scotch Magic Transparent Tape. [p. 111]

[Pugh admits that it can be nearly impossible to complete the figure. Not only does the last piece have to be perfectly aligned along several edges before it can be brought into contact with the appropriate tabs, it is difficult to bond the tabs of the last piece to their counterparts when all of the tabs are located inside of a nearly completed polyhedron.]

"Once a face has been drawn, check it for accuracy, as an inaccurate face will create an inaccurate model and will thus waste a lot of effort. If a face has not come out accurately, find the mistake and draw a fresh one. Inaccurate faces should be discarded or be clearly marked, to prevent their being used accidentally." [p. 115]

[Above, Pugh cites a limitation shared by all of the Prior Art: inaccurate faces create inaccurate models. An inaccurately cut face that has been glued into place will be difficult to remove—"the glue is very tenacious." Unfortunately, the unacceptable tolerances of a face may not become apparent until it has been partially glued in place and only then proves to be unwilling to mesh further with its neighboring polygons.]

"Construction of Models

The easiest way of building these models is to cut out the requisite number of faces and join them, edge to edge, till the model is complete. For those models which can be broken down into smaller parts (FIGS. 15-66 and 75-92) it is a good idea to build the parts separately, so that they can be joined together in various ways, thus allowing several figures to be explored by using the same parts. [p. 33]

[Here, Pugh admits the desirability of having reusable components, but even then, only for those polyhedra sharing identical configurations of polygons. For example, none of the Platonic solids would be candidates, since the configuration of polygons around any given vertex of a Platonic solid is unique to that specific polyhedron. The present invention allows all polygons to be reused, both individually as well as in groups.]

Cundy and Rollett, in Mathematical Models, are not overly concerned with teaching how to construct polyhedra. As its title suggests, mathematics is the primary focus of the book and methods of construction are not discussed in detail. Instead, the book focuses on tools and materials that can be used to construct polyhedra.

In the little that they have to say about construction of polyhedra, Cundy and Rollett describe a way to minimize the number of tabs, once one has a suitable "net" (a diagram of connected polygons that can be folded into the desired polyhedron) for the polyhedron. Cundy and Rollett prefer cardboard and "Perspex" as building materials; "Perspex" is evidently a type of acrylic plastic that is easily scratched. Applicant was only able to locate one piece of germane advice concerning the actual construction of models:

"For joining, a quick-drying cement, such as balsa-wood cement as used for model aircraft, is essential. After the cement has been applied to a tab, the edges to be joined are brought together, and the tab can be held down with a small wire paper-fastener while the cement dries. This is particularly useful in small models when the fingers cannot easily get inside, and near the finish of any model when there are several edges to be joined at once . . . . A thin wire probe is sometimes useful in getting the last face to adhere. [pp. 82-83]

Here, Cundy and Rollett echo Pugh's remark about the difficulty of attaching "the last piece"; fitting the last piece cleanly into a model poses a problem when the techniques of the Prior Art are employed. Because Cundy and Rollett, Wenninger and Holden add little or nothing to the construction techniques described by Pugh, Applicant will primarily consider the Prior Art of Pugh, cited above, in the discussion that follows.

The present invention overcomes virtually all of the limitations pointed out by Pugh. Because no permanent adhesive is used to hold the component polygons in place, perfect initial positioning of the polygons to be brought together is not an issue. Furthermore, the use of joining tabs allows a malformed polygon to be easily removed and replaced. Its unacceptable shape is likely to be discovered even before the face has been locked into place with Velcro hook and loop, but even if it has already been secured in place, the Velcro can easily be detached to allow the removal and replacement of the face. Because no tape is used, any shortcomings pertaining to tape are irrelevant. Joining tabs allow three or more joined polygons to quickly and conveniently converge to the correct dihedral angle, following which Velcro hook and loop can be used to secure the joined polygons in place. Once a few polygons have been accurately joined, the rest of the polygons will fit readily into place at the prescribed dihedral angles.

If every side of every polygon were to contain a slot in its center, the last piece (the viewport) will be presented with as many slots as it has sides: available slots will completely surround the final polygon-shaped gap. The viewport therefore needs no slots: tabs can be attached directly and permanently to the centers of one or more of its sides. Only two or three tabs need to be glued to a viewport—enough to hold it stably in place. These tabs will slide into the slots provided by the surrounding polygons; "the last piece" thus poses no special problem. In addition to addressing the problem posed by "the last piece," this method also allows a viewport to retain a maximum undistorted viewing area. The tabs attached to a viewport should be especially slender, to allow them to slide more easily into the surrounding slots. This also helps to maximize the undistorted viewing area of the viewport.

Pugh's recitation of the limitations of his methods speaks to the unobviousness of the present invention. Had two identical polygons been superimposed on one another and all of their vertexes were judiciously taped, stapled or glued together (taking care to keep an area in the center of each side and the area in the center of the joined polygons free of adhesive or material obstructions), the rough equivalent of slots would have been created. Depending on the stiffness of the cardboard, the superimposed polygons might have needed to have a shim glued between them instead of being directly glued to each other. Tabs could now be cut from the same cardboard stock as the shims. Had Pugh fashioned his hinged tabs to resemble long, skinny tabs shaped more like litmus paper strips than traditional hinges, one of these skinny hinged tabs could have been inserted into the slot in the center of one of the faces of two glued-together polygons. The other end of the hinged tab could then be inserted into a corresponding slot in another polygon, thereby joining the two polygons via a somewhat flexible connector and thus achieving the bulk of the benefits of the present invention. Had a generous enough area been left in the center of the polygon and in the center of the sides, the de facto slot thereby created could conceivably directly accommodate one of Pugh's hinged tabs (sans adhesive). Polyhedra assembled in this manner would be much easier to construct. Moreover, a completed polyhedron could be disassembled and its component polygons reused.

Therefore, with a bit of imagination and creativity, the slot-and-joining-strip method of the present invention could have been readily anticipated using only the materials cited by Pugh, slightly rearranged and modified. By connecting polygons with hinged tabs, and using a little tape to lock the faces into their relative positions, this approach would have overcome virtually all of the limitations cited above by Pugh, yet the method of the present invention remained undiscovered by Pugh or any of his contemporaries. The present invention thus offers a solution to a long-felt but hitherto unaddressed need.

The above hypothetical approach would have retained most of the advantages conferred by the present invention.

For example, tape would not have to perform the double duty of both aligning and holding the faces in position as taught by Pugh; instead, it would only need to keep the faces from shifting. A cardboard tab would align the faces and provide a large measure of structural support; hence, tape would neither need to be applied as copiously nor as forcefully as taught by Pugh. Small strips of tape, far less strenuously applied, would serve to lock the faces in place, and a completed polyhedron could be disassembled with far greater ease than a figure constructed in strict accordance with Pugh's instructions. Following disassembly, the component polygons could be reused to construct new polyhedra.

In the 1970s, the brilliant artist Rowena Patee cut glass mirrors into regular polygon shapes and assembled these polygons into a set of Platonic solids for her own personal use. The glass mirror Platonic solids that she created were never offered for sale. Rowena used silicon seal to glue the mirrors into place; therefore, as was the case with Holden and Wenninger, component polygons could not readily be reused.

In order to provide visibility into the centers of the polyhedra, Rowena scraped off a tiny circle of the opaque mirror backing from the center of a single face of each polyhedron. However, removing enough backing material from a mirror to allow one to see through the mirror creates a visible flaw in the mirror: the mirrored surface is being scraped off, leaving a somewhat clear glass window. Accordingly, such scraping must be constrained to a small area or the damage to the mirror becomes obvious and objectionable. Unfortunately, this results in a pinhole-like viewport that is too small to allow a user to fully experience the infinite internal reflections of the polyhedra.

The two-way mirror viewport of the present invention provides a much more generous viewing area that allows a user to enter fully into the experience of the infinite internal reflections. There is no visible flaw when two-way mirror is used as a viewport: if the interior of the polyhedron is brightly lit, the reflections from the two-way mirror are virtually identical to those of the one-way mirrors. Rowena's mirrored polyhedra also suffered from the limitation that they are pre-made objets d'art—a user can handle and admire them, but he or she will not be able to disassemble and reassemble them.

The essential difference between a toy and an objet d'art is the interactivity provided. One can play with a toy—directly interacting with it by taking it apart and putting it back together and reassembling it into different shapes—while one is limited to admiring and appreciating an objet d'art. Pugh, Wenninger and Holden all directly emphasize how important it is to actually build the models, rather than just handling them or, even worse, looking at pictures of them. Cundy and Rollett are less straightforward, but they authored a book that "gives detailed instructions for making a wide variety of models illustrating elementary mathematics" [from the flyleaf]. The experience of creating a polyhedron is not possible with a pre-made objet d'art; the artist has done the work for you.

For safety reasons, polygons used in a toy should be made from plastic rather than from glass. Plastic mirror that is thinner than glass mirror can be found, and can be cut to closer tolerances than glass. Plastic polyhedra can be constructed whose sides fit together so well that very little light is allowed to penetrate the interior, making the infinite internal reflections dim and indistinct when viewed through the two-way mirror viewport. Illuminating the interior of a plastic polyhedron with a bright light source would solve this problem, but another approach would be to ensure that a gap is left when the sides of the polygons are joined together. This can be accomplished in several ways. A tab whose center has deliberately been made too wide to slide into a receiving slot will have the effect of separating the sides of the two polygons by the length of the widened center portion of the joining strip. Using this scheme, the width of the gap separating the sides of two joined polygons can be varied by increasing or decreasing the length of the wide spot. Another approach would be to make every vertex of every polygon rounded instead of pointed. The rounded vertices would keep the sides of the joined polygons from fitting snugly together, and would provide additional safety by blunting the vertices of the component polygons.

Holden says in the preface to his book [emphasis added]:
"The best way to learn about these objects is to make them, next best to handle them. Printed pictures are poor substitutes for moving pictures but better than words alone. This book can offer only pictures and a few words to connect them." [page is not numbered]

Wenninger says in his preface [emphasis added]:
"There is another question many people ask when they see these polyhedron models: 'What do you use them for?' Maybe the answer to this is best given by a return question: 'Does beauty need to have uses?' Admittedly the only use a model has, once it has been constructed, is for display purposes." [p. ix]

Pugh says [emphasis added]:
"The best way of becoming familiar with these figures is through building and studying models of them. [p. 1]
"Though the concepts and relationships described in this volume are comparatively simple, they are often difficult to visualize. The reader can overcome this and can become familiar with the shapes and symmetries of the figures by building models of them. It takes time and patience, but it saves a lot of time and frustration in the long run." [p. 108]

Cundy and Rollett assume that the reader will be building his or her own models. In their typically terse style, they say [emphasis added]:
"The human mind can seldom accept completely abstract ideas; they must be derived from, or illustrated by, concrete examples. Here the reader will find ways of providing for himself tangible objects which will bring that necessary contact with reality into the symbolic world of mathematics." [p. 13]
"The main use of a model is the pleasure derived from making it . . . . The creative value of a model is there for anybody who will take the trouble to make it. A mathematician who cannot express himself in other ways may be able to make an attractive model, and make it well . . . ." [p. 14]

Although both Pugh and Holden stress the importance of actually making polyhedra and purport to instruct a reader of how to go about doing so, construction of convex polyhedra using the methods they teach is slow, messy, tedious and arduous. The Prior Art does not provide for disassembly and reuse of component polygons—polyhedra constructed according to the Prior Art are meant to be permanent, and cannot easily be dismantled. The potential to display infinite internal reflections is not considered in the Prior Art. The Prior Art has ignored the proclivity of three or more polygons to naturally orient themselves correctly and to spontaneously assume correct dihedral angles, with a minimum of urging. The present invention addresses all of the shortcomings listed above.

BACKGROUND OF THE INVENTION

Accordingly, besides the objects and advantages of the polycarbonate plastic strip joining mechanism described above, several objects and advantages of the present invention are:
a) to provide a joining mechanism that facilitates the assembly of Platonic or Archimedean solids from component regular polygons;
b) to provide a joining mechanism that has hinge-like qualities and serves to keep the sides of two joined polygons aligned on the same line;
c) to provide a joining mechanism that has a great deal of spring action and allows ready adjustment of the dihedral angle formed by the faces of said two joined polygons;
d) to provide a joining mechanism that resists deformation and can be bent through a wide range of dihedral angles without permanently kinking;
e) to provide a joining mechanism that allows an assembled polyhedron to easily be disassembled into its component polygons;
f) to provide a joining mechanism that allows an assembled polyhedron to be disassembled without damage to its component polygons;
g) to provide a joining mechanism that allows an assembled polyhedron to assembled without the need for permanent adhesives;
h) to imbue convex polyhedra with the potential for infinite internal reflections by providing one-way mirrored faces on the component polygons;
i) to realize said potential for infinite internal reflections by orienting said one-way mirrored faces of the component polygons such that said mirrors face the interior of the convex polyhedron;
j) to provide a way to readily view said infinite internal reflections by fashioning one or more of the said component polygons wholly or partially from two-way mirror;
k) to create a viewport by including at least one polygon that has been wholly or partially fashioned from two-way mirror in the construction of a polyhedron;
l) to provide a joining mechanism that consists of two parts: an aligning means that serves to help position the joined pieces relative to one another, and a supporting means that holds the joined pieces in said relative position.

BRIEF SUMMARY OF THE INVENTION

The present invention recognizes a new use for polycarbonate plastic as a joining mechanism, or tab. Polycarbonate plastic can easily be cut with regular scissors; it is rust-proof and resistant to corrosion. Polycarbonate plastic is lightweight and inexpensive, and a thin tab of polycarbonate plastic can be flexed through a wide range of motion without permanent deformation; the range of motion of a polycarbonate plastic tab far exceeds that of a metal strip of a corresponding size. Polycarbonate plastic can be bent and creased and will subsequently hold an angle and preferentially bend at the crease; this is especially useful for facilitating the construction of Platonic and Archimedean solids from component regular polygons.

Polycarbonate plastic strips, or tabs, by themselves, act more as connectors than fasteners, and often prove insufficient to hold the joined pieces firmly enough in place. However, they can readily be supplemented with Velcro hook and loop whereby the plastic tabs provide the initial fit and orientation of the pieces that are to be joined, and the Velcro hook and loop, once applied, provides support and stability to the joined pieces. Together, the connecting means provided by the polycarbonate plastic tabs coupled with the supporting means provided by the Velcro yield an effective and easy-to-use fastening means by which two or more polygons can be conveniently and securely joined.

Although the polycarbonate plastic joining mechanism described herein will prove useful for a variety of applications, it is especially useful in the construction of Platonic and Archimedean solids. Platonic solids are structures comprised of identical planar polygons, i.e., squares, equilateral triangles, and regular pentagons, with a further constraint that each vertex has the same number of incident edges as any other. There are five Platonic solids: the tetrahedron, the hexahedron (cube), the octahedron, the dodecahedron, and the icosahedron. A joining mechanism that can accommodate the wide range of angles described by the faces of the various Platonic solids (acute for the tetrahedron; normal for the hexahedron; and obtuse for the dodecahedron and icosahedron) was sought, but the Prior Art provided nothing that was satisfactory.

The Platonic solids must satisfy the constraint that the same number of identical regular polygons must meet at each vertex. If this constraint is relaxed to allow non-identical polygons to meet at the vertices, the thirteen Archimedean solids become possible. The same joining mechanism that proved helpful in constructing the Platonic solids proves equally useful in the construction of Archimedean solids. The same regular polygons that were used to make Platonic solids can be recycled to make Archimedean solids, and the same joining mechanism employed. However, due to the large number of faces of Archimedean solids compared to Platonic solids, smaller polygons might be desirable, to restrict the final polyhedron to a manageable size.

Jay Kappraff, in Connections, the Geometric Bridge Between Art and Science, states:

Only 92 polyhedra can be constructed in addition to the thirteen Archimedean solids, five Platonic solids, and two infinite families of prisms and anti-prisms . . . .[p. 329]

The joining mechanism of the present invention will greatly facilitate the construction of all of these figures, providing that a slot capable of accepting a polycarbonate plastic tab is to be found in the center of each polygon face that is to be joined. Not every side of every polygon needs a plastic connector, however. As a polyhedron begins to take shape, the angles at which its polygons must meet become more apparent, often dispensing with the need for a tab; the polygons can then be Velcroed directly into place once one or more edges have been properly aligned.

BRIEF DESCRIPTION OF THE DRAWINGS

Note: FIG. 6, like FIG. 5, is for illustrative purposes only. The polyhedron depicted in FIG. 6 is not stable, since only its top edge is securely fastened. The top edge of the cube is intended to serve as a template, or exemplar, of how the rest of the edges are to be connected, except as noted below in the Detailed Description of Drawings section.

FIG. 10 depicts Object 10, an equilateral triangle. Slots in the center of each side of Object 10 have been created by affixing U-shaped channels 20 to the center of each side of Object 10. Velcro loop 60 has been affixed to Object 10 near its apexes.

FIG. 11 depicts Object 10, a square. Slots in the center of each side of Object 10 have been created by affixing U-shaped channels 20 to the center of each side of Object 10. Velcro loop 60 has been affixed to Object 10 near its corners.

FIG. 12 depicts Object 10, a regular pentagon. Slots in the center of each side of Object 10 have been created by affixing U-shaped channels 20 to the center of each side of Object 10. Velcro loop 60 has been affixed to Object 10 near its vertexes.

DETAILED DESCRIPTION OF THE INVENTION

Figure 1:
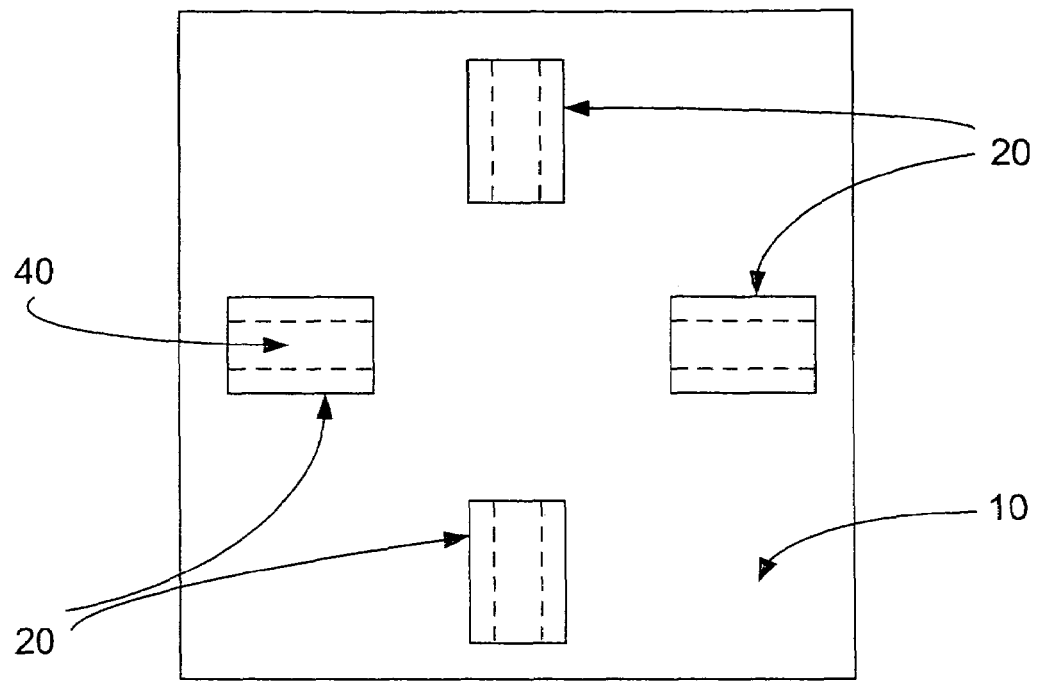
FIG. 1 is a top view of Object 10, a regular polygon. Object 10 (a square, in this instance) has been equipped with a joining mechanism at the midpoint of each of its sides: U-shaped channels 20 are affixed to Object 10 that is to be joined to another Object 10. Dotted lines show location of Channels 40. When a U-shaped channel 20 is affixed to an Object 10, its Channel 40 is thereby bounded by Object 10, creating a slot that will eventually house a Tab 30 (not pictured).

FIG. 1 is a top view of a regular polygon equipped with a joining mechanism at the center of each side. Although for simplicity a square has been depicted, any regular polygonal-shaped planar polygonal member (in particular, triangles, squares, pentagons, hexagons, octagons, and decagons) can serve as Object 10. Indeed, Object 10 need not be a regular polygon at all. Any shape that is to be joined to another shape can comprise Object 10. U-shaped channel member 20 exists solely to form a slot by bounding Channel 40 by Object 10. The slot thus formed is intended to accept resilient joining Tab 30 (pictured in FIG. 3). To create slots for Tabs 30, U-shaped channels 20 are installed perpendicular to one or more sides of regular polygons that will be building blocks for Platonic and Archimedean polyhedra. U-shaped channels 20 are additionally located at the midpoint of a side and slightly inset from the edge in order to accommodate a pre-formed angle in Tab 30. Note that U-shaped channels 20 do not need to be set back from an edge; they could equally well be set flush to the edge.

Figure 2:
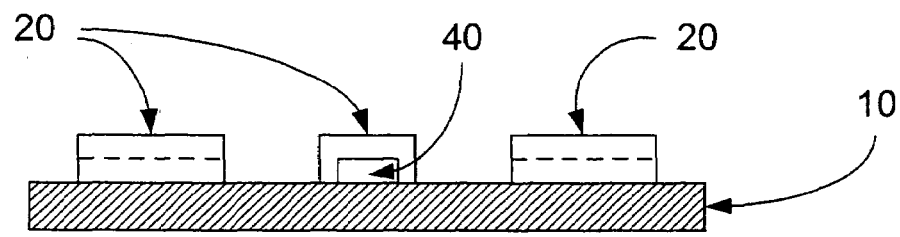
FIG. 2 is the same Object 10 depicted in FIG. 1, only viewed edge-on rather than from the top; it is a regular polygon (a square, in this case) with a universal connection point, or slot, at the midpoint of each of its sides. U-shaped channels 20 have been affixed to Object 10 at the midpoints of its sides to create said slots; a slot delineated by Channel 40 and bounded by Object 10 can clearly be seen at the center of the figure.

FIG. 2 is a side view of a regular polygon equipped with a joining mechanism at the midpoint of each side. The slot in the center of Object 10 that is created when Channel 40 of U-shaped channel 20 is bounded by an Object 10 is clearly visible. If a slot capable of accepting a Tab 30 were to be directly cut, gouged, milled or otherwise created by removing material from the center of a side of Object 10, U-shaped channels 20 would not be needed. Similarly, if Object 10 were to be molded or cast, and a slot into which a Tab 30 could be inserted were to exist in the center of one or more sides of the finished cast or molded pieces, there would again be no need for U-shaped channels 20. An Object 10 with a slot built into the center of one or more of its sides would render the use of U-shaped channels 20 unnecessary. Thus, a slot into which Tab 30 fits is the mandatory requirement; using a U-shaped channel 20 to create such a slot is merely one means to achieve this end.

Centering a slot on a side of a polygon creates a universal connection point that, along with a Tab 30, will allow a polygon to be joined to any other polygon, as long as the side of the second polygon is the same size as the side to which it is to be joined, and further provided that both sides to be joined possess slots in their centers.

Figure 3:
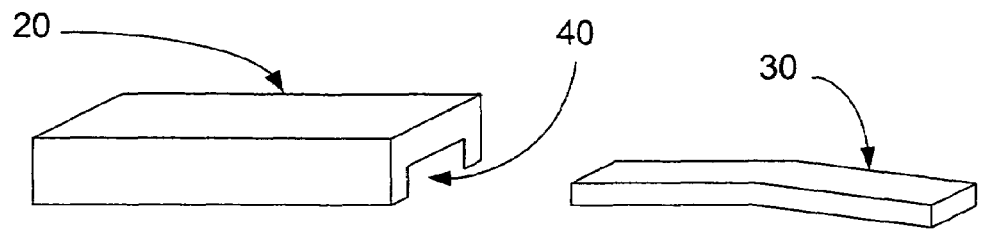
FIG. 3 is an enlarged view of a joining mechanism. Channel 40 is intended to form a slot when U-shaped channel 20 is bonded to Object 10 (not pictured). Each end of Tab 30 will fit into a slot thus formed, thereby joining an Object 10 (not pictured) to another Object 10 (not pictured).

FIG. 3 shows a U-shaped channel 20, which in conjunction with Object 10 (not pictured) forms a slot when Channel 40 is bounded by Object 10. The slot thus formed accepts one end of Tab 30, leaving the other end of Tab 30 protruding. When one end of Tab 30 is fitted into a slot of an Object 10 and the protruding end of Tab 30 is fitted into a slot of a different Object 10, said Objects 10 will be loosely joined together. Although Tab 30 is depicted as having been creased into holding an angle, Tab 30 could equally well be straight. Tab 30 is quite flexible and allows the dihedral angle created by joined Objects 10 to be readily adjusted to virtually any angle desired; all the while ensuring that the joined sides of Objects 10 meet crisply in a line to form an edge.

Figure 4:
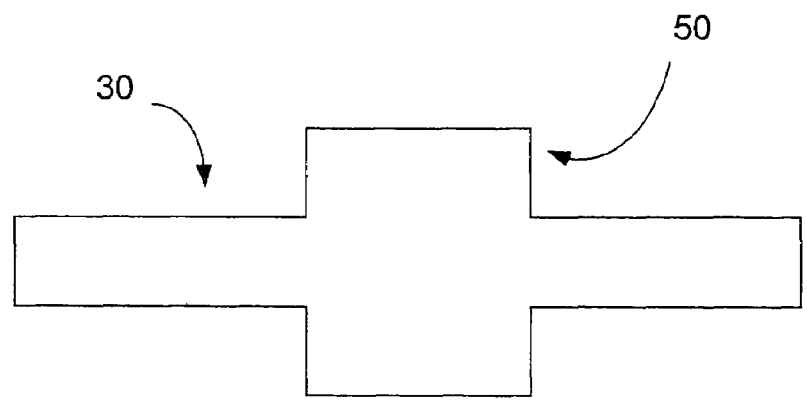
FIG. 4 depicts a Tab 30 with a widened middle section 50. Widened middle section 50 exceeds the width of Channel 40, preventing it from sliding into Channel 40 and thus separating joined Objects 10 (not pictured) by the length of widened middle section 50.

FIG. 4 depicts a Tab 30 with a Widened middle section 50. As recounted above in the lengthy Polyhedra Models portion of the Closest Known Prior Art Described in Detail section, when polyhedra are constructed from plastic mirror the tolerances can be fine enough that very little light is admitted to the center of a polyhedron. Widened middle section 50 serves to hold the sides of Objects 10 (not pictured) apart from each another, allowing more light to penetrate into the interior of a polyhedron. Because two-way mirror operates on a light differential, the interior of a polyhedron must be brightly lit if the two-way mirror is to transmit light like a window instead of reflecting light like a mirror. Widened middle section 50 need not have square shoulders; its shoulders could equally well be rounded or beveled.

Figure 5:
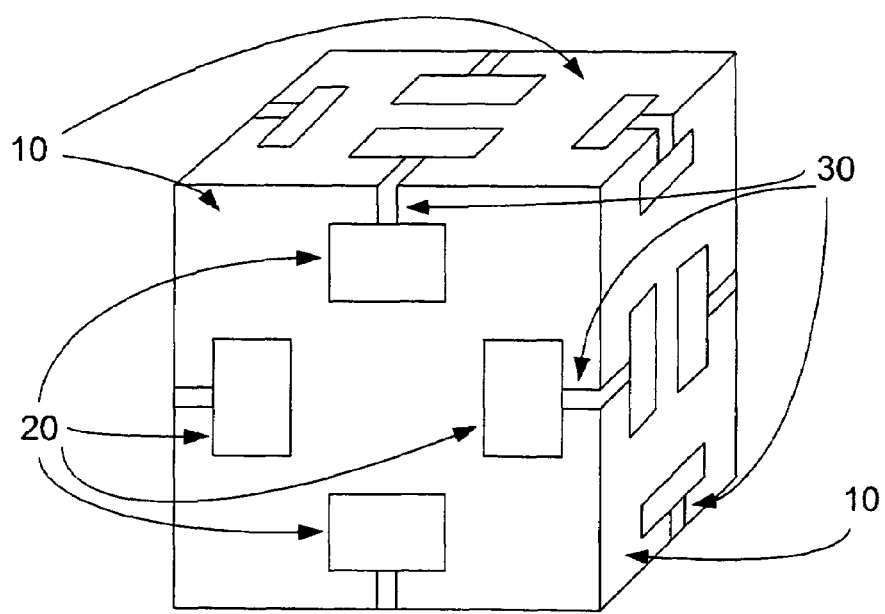
FIG. 5 diagrammatically depicts a cube comprised of Objects 10 whose faces are held together by Tabs 30. Tabs 30 have been fitted into slots created by bonding U-shaped Channels 20 to the faces of Objects 10, at the midpoints of its sides. Note: Tabs 30 alone cannot hold the cube together; the polyhedron pictured is not stable.
Figure 6:
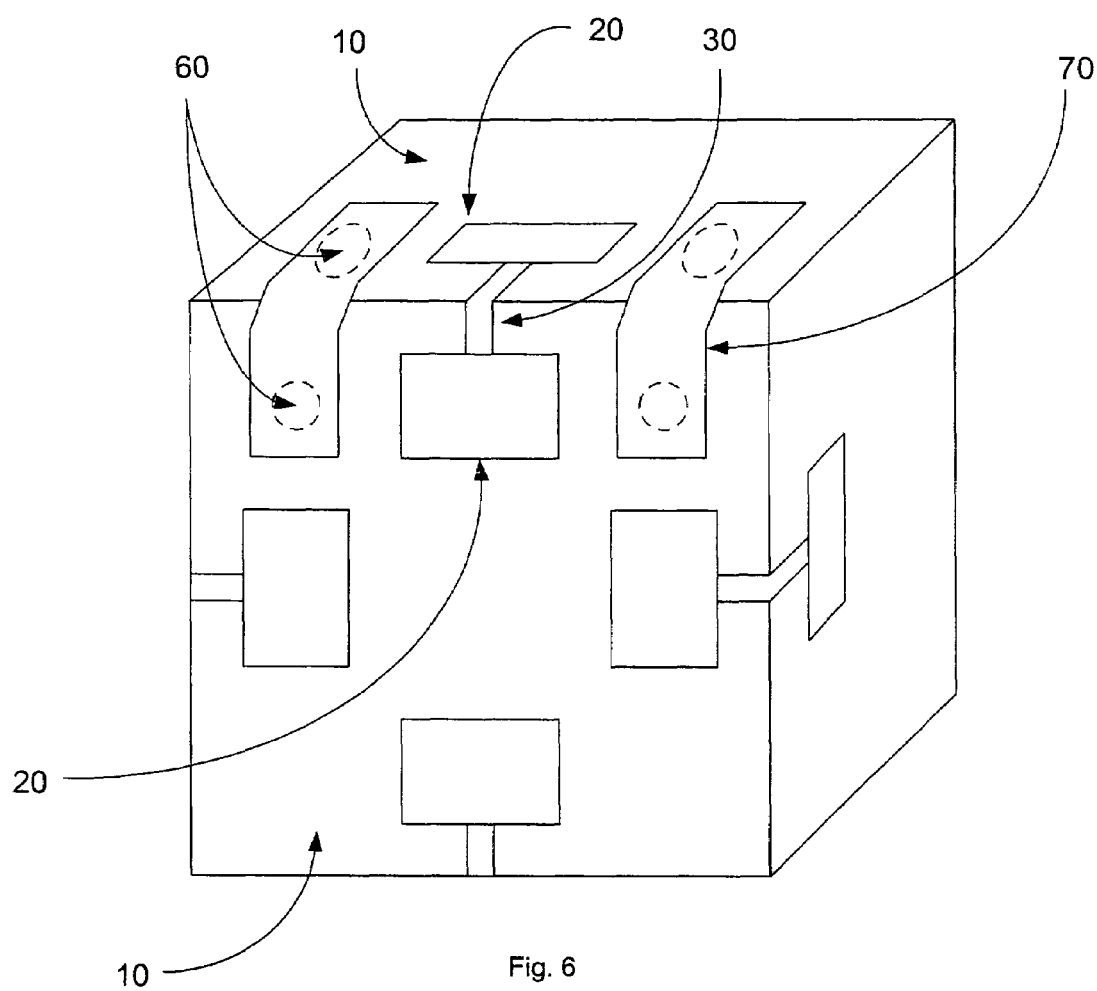
FIG. 6 diagrammatically depicts a cube comprised of Objects 10 whose top edge has been stabilized by using Velcro. Circles of Velcro loop 60 have been permanently glued to Objects 10, and strips of Velcro hook 70 have been stretched tight over Velcro loop 60 and secured to it. The circles of Velcro loop 60 will not be directly visible (unless transparent strips of Velcro hook 70 were used), and thus have been drawn with dashed lines. Tabs 30 hold Objects 10 in position, with the joined sides of the polygons aligned along an edge, while Velcro hook 70 is being applied.

FIG. 5 depicts a completed polyhedron (a cube, for simplicity and ease of drawing.) The completed polyhedron could be any Platonic or Archimedean solid; the polyhedron is not restricted to being a cube. Although the polyhedron is shown as being held together purely by Tabs 30 fitted into slots created by bounding Channels 40, said Tabs 30 will not be sufficient to hold the figure together without a tensioning means such as rubber bands wrapped around it. Two sturdy rubber bands (not shown) wrapped around the cube at right angles to one another would suffice to stabilize the cube, but the use of Velcro is a more elegant, general and durable solution. FIG. 5 depicts the joining mechanism in its simplest and purest form before complicating the drawing by introducing Velcro as a reinforcing agent (as shown in FIG. 6). For ease of drawing, U-shaped channels 20 and Tabs 30 have diagrammatically been depicted as flat, rather than as the three-dimensional objects that they actually are.

FIG. 6 depicts a completed polyhedron, the top edge of which has been stabilized using Velcro hook and loop. Stabilizing only this top edge would obviously be insufficient to ensure the stability of the polyhedron, but to reduce clutter the other edges are depicted as unadorned by joining mechanisms. In practice, similar use of Velcro hook and loop would occur anywhere that two sides meet. Once a polyhedron becomes nearly complete, the use of Tabs 30 can become optional, but Velcro hook and loop should always be used to lock two joined sides together. The most solid and stable polyhedron would repeat the configuration shown for the top edge on every one of its edges (save for the viewport, which is made wholly or partially of two-way mirror and which would have Tabs 30 glued or otherwise affixed directly to it, rather than using U-shaped channels 20 to create slots that Tabs 30 would slide into).

Squares or rectangles of Velcro loop 60 would provide more surface area than circles; Velcro loop 60 is shown as circular for clarity. The hook and loop could be reversed: strips of Velcro loop could just as well connect circles of Velcro hook, and vice-versa. As before, the polyhedron need not be a cube; it could be any Platonic or Archimedean solid. The cube was chosen because it is the simplest to draw. For ease of drawing, U-shaped channels 20 and Tabs 30 have diagrammatically been depicted as flat, rather than as the three-dimensional objects that they actually are.

Figure 7:
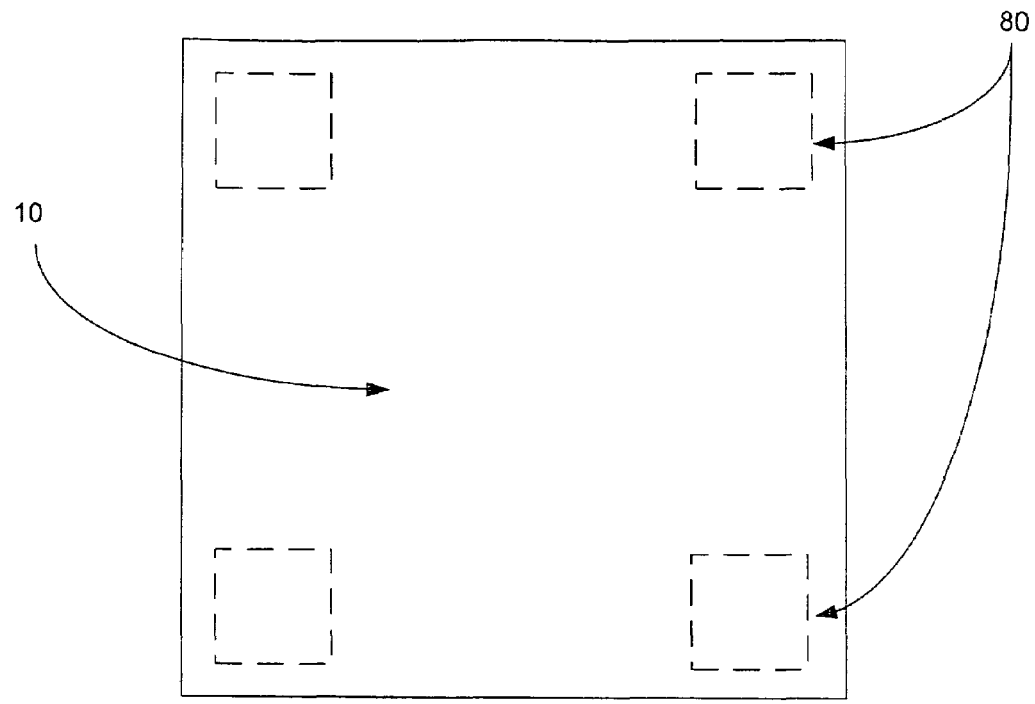
FIG. 7 depicts the top view of a hypothetical version of the present invention that uses the materials of the Prior Art (Anthony Pugh, *Polyhedra a visual approach*). Object 10 is a square of cardboard that has been superimposed over another Object 10. Cardboard shims 80 have been glued between the top and bottom Objects 10, separating the two Objects 10 (squares of cardboard). Instead of having a slot in the center of each side, there is a central gap between the two polygons that is dimensioned to accept tabs.

FIG. 7 shows a square Object 10 that has been given the equivalent of slots in the centers of its sides. These slots cannot be seen in a top view, but will be clearly visible in the side view shown in FIG. 8. Object 10 does not have to be a square; a square shape was chosen for ease of drawing. Object 10 could be a triangle, a pentagon, a hexagon, an octagon, a decagon, or indeed any polygon. The figure depicted in FIG. 7 is purely hypothetical and is only intended to illustrate the ease with which the Prior Art could have anticipated the present invention, thereby vastly facilitating the ease with which polyhedra could be constructed while also providing them with the attribute of being capable of being detached and thus able to be disassembled.

Figure 8:
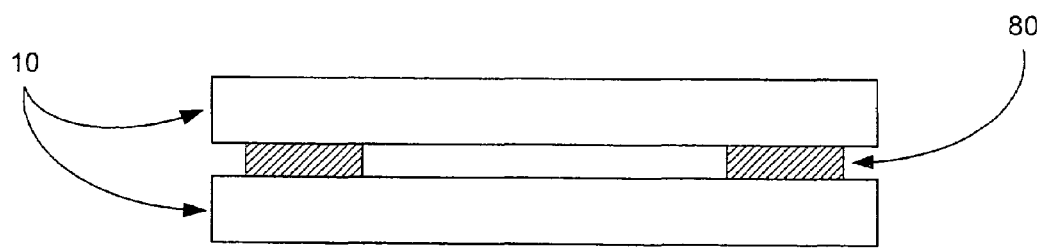
FIG. 8 is a side view of the cardboard "sandwich" shown in FIG. 7. Both Objects 10 (squares of cardboard, in this case) can clearly be seen, and the separation provided by cardboard shims 80 is also clearly shown. The equivalent of a slot is clearly visible between the two shaded cardboard shims 80, and a cardboard tab 90 will fit into this slot.

FIG. 8 shows a side view of a square Object 10 that has been given the equivalent of slots in the centers of its sides by superimposing it onto another Object 10 of the same size and gluing the Objects 10 together, separated by cardboard shims 80. A different embodiment of FIG. 8 could have depicted Objects 10 as being directly glued together; however, in order to more clearly illustrate the gap between Objects 10 that will effectively provide slots in the center of its sides, the embodiment is depicted with cardboard shims 80 separating the two Objects 10. The cardboard shims 80 are made from the same weight of cardboard as the cardboard connecting strips 90 described below in FIG. 9. The "polygon sandwich" depicted in FIG. 8 is purely hypothetical; see also the detailed description of FIG. 7, above. Object 10 could be any regular polygon rather than a square.

Figure 9:
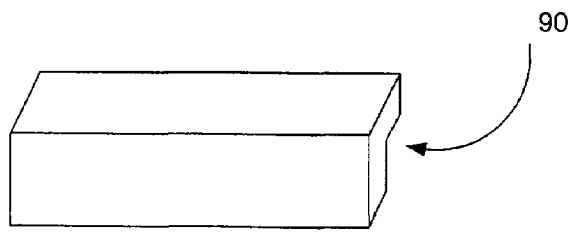
FIG. 9 depicts a cardboard tab 90 made from the same gauge cardboard as shims 80 of FIG. 7 and FIG. 8. Cardboard tab 90 is a rectangle that has been folded lengthwise; its dimensions will allow it to slide into the slot that was created when cardboard shims 80 were glued between cardboard squares (Objects 10). Cardboard tab 90 has been bent lengthwise, thereby establishing a propensity to bend where it was folded and provide a hinging action.

FIG. 9 depicts a cardboard connecting strip 90. Because it has been cut from the same cardboard stock as shims 80 of FIG. 8, it will fit securely into the gap in the center of a side of the polygon "sandwich" depicted in FIGS. 7 and 8. A cardboard connecting strip 90 thus provides, in a rudimentary fashion, the basic functionality of a Tab 30. Cardboard strip 90 has been folded lengthwise, thereby weakening the cardboard at the fold; it will consequently provide a hinging action at the fold. Cardboard strips 90 will align the sides of the polygons that they connect, ensuring that said sides meet parallel at an edge. Without cardboard strips 90, there is nothing to prevent the sides of the polygons from skewing or misaligning. Cardboard strips 90 would permit multiple polygons to be connected, making them easier to align and thus making it far easier to fit said polygons together into polyhedra. Cardboard strips 90 would provide a good deal of structural support, allowing a polyhedron to be stabilized by using a minimal amount of tape. Because the edges of the polyhedron would not be permanently fused or adhered, the polyhedron could be disassembled into component polygons—by cutting the tape that holds it together, if necessary.

Figure 10:
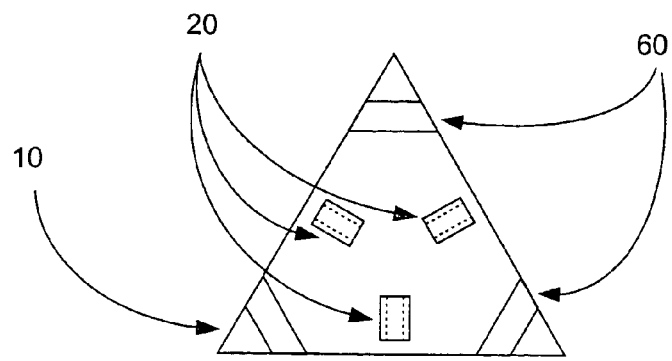
FIG. 10, FIG. 11, and FIG. 12 depict top views of regular polygons that have been fitted with U-shaped channels 20 and Velcro loop 60. A plurality of these figures would allow all of the Platonic solids to be constructed. The figures are aligned to illustrate how a slot located in the center of a side of a regular polygon will allow another polygon that possesses a different number of sides to be joined to it via a Tab 30 (not shown).

FIG. 10 depicts an equilateral triangle (Object 10) that has been provided with slots in the centers of its sides by having U-shaped channel 20 permanently affixed at the midpoints of its sides. In addition to U-shaped channel 20, Velcro loop 60 has been secured to its apexes. Velcro hook 70 will later be fastened between Velcro loop 60 on two different polygons and will hold said polygons together, preventing them from shifting or changing position. While U-shaped channel 20 must be fairly precisely located at or around the midpoint of a side of the triangle, the positioning of Velcro loop 60 is not nearly as critical. Velcro loop 60 does not need to have the shape depicted in FIG. 10; any shape that allows a strip of Velcro hook 70 to connect a Velcro loop 60 on one polygon to a Velcro loop 60 on a different polygon would suffice. In practice, it is easier to cut Velcro loop 60 into rectangular pieces than into circular pieces, and rectangles provide more surface area than circles. Instead of affixing Velcro loop 60 to Object 10, Velcro hook 70 could instead be affixed—the only requirement is consistency.

Figure 11:
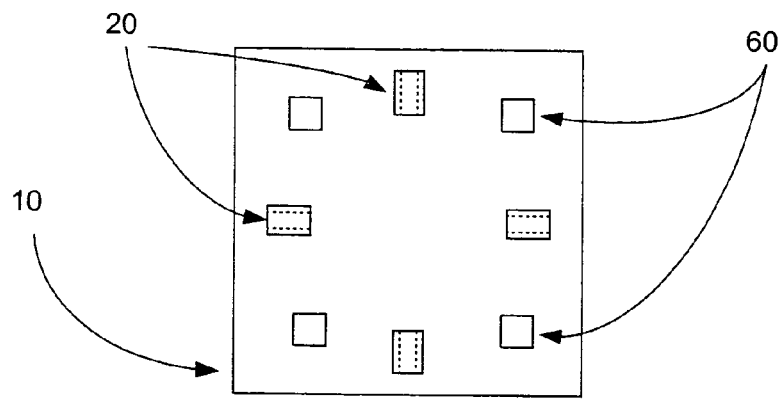

FIG. 11 depicts a square (Object 10) whose sides are the same length as the sides of the equilateral triangle shown in FIG. 10. Said square 10 has been provided with slots in the centers of its sides by having U-shaped channel 20 permanently affixed at the midpoints of its sides. In addition to U-shaped channel 20, Velcro loop 60 has been secured to its corners. As with the triangle of FIG. 10, U-shaped channel 20 must be fairly precisely located at or around the midpoint of a side of the square; however, the positioning of Velcro loop 60 is not nearly as critical.

Velcro loop 60 does not need to have the shape depicted in FIG. 11; in fact, a rectangular shape would provide more area that a strip of Velcro hook 70 could connect to. The Velcro loop 60 depicted could just as well be Velcro hook 70; the important thing is to be consistent. Once the first polygon has been outfitted with Velcro loop 60, all polygons should be similarly outfitted, allowing any two polygons to be secured together by applying a strip of Velcro hook 70. However, had the first polygon has been outfitted with Velcro hook 70, all subsequent polygons should then be similarly equipped with Velcro hook 70, such that any two polygons could be joined by a strip of Velcro loop 60.

Figure 12:
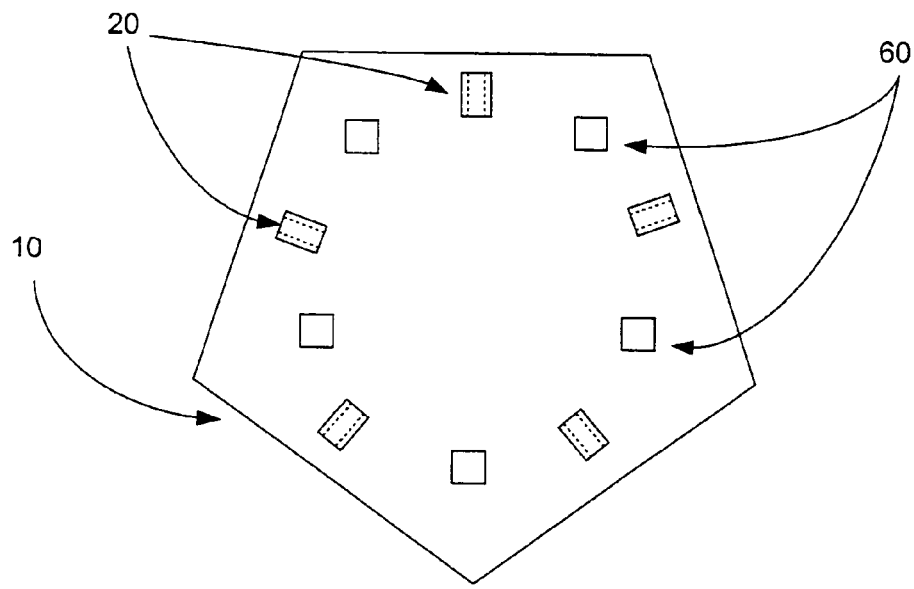

FIG. 12 depicts a regular pentagon (Object 10) that has been provided with slots in the centers of its sides by having U-shaped channel 20 permanently affixed at the midpoints of its sides. In addition to U-shaped channel 20, Velcro loop 60 has been secured to its corners. Object 10 has the same-length sides as the regular polygons shown in FIG. 10 and FIG. 11. As with previous polygons, U-shaped channel 20 must be fairly precisely located at or around the midpoint of a side of the pentagon, and the positioning of Velcro loop 60 is not nearly as critical. Again, as with the square, the Velcro loop 60 does not need to have the shape depicted in FIG. 12; a rectangular shape would provide more area for a strip of Velcro hook 70 to hook into.

OPERATION

The invention is completely intuitive to operate and requires little training or explanation. One end of Tab 30 (a strip of polycarbonate plastic with an approximate thickness of 0.030") is inserted into a slot of one Object 10 to be joined, while the other end of Tab 30 is inserted into a slot in the other Object 10 to be joined. Tab 30 (a strip of polycarbonate plastic—the joining mechanism of the present invention) thus joins the two Objects 10 by fitting into slots in each Object 10. Should the joined pieces need more support than is afforded by Tab 30, Velcro hook and loop can be applied as an adjunct.

Tab 30 can be bent and creased to hold a given angle. Should a hinging action be desired, Tab 30 will preferentially bend where it has been creased, and said hinging action will preferentially occur at said crease. The dihedral angle is adjusted simply by rotating the faces to the desired angle. Linking multiple polygons together makes them more amenable to assuming their correct alignment, thus greatly increasing the speed and ease with which polyhedra can be constructed from component polygons. Once a user is satisfied with a dihedral angle or angles, Velcro can be used to lock the faces into place.

ADVANTAGES

From the description above, a number of advantages of a joining mechanism (Tab 30) fabricated from polycarbonate plastic become evident:
 a) the polycarbonate plastic joining mechanism (Tab 30) is lightweight;
 b) the polycarbonate plastic joining mechanism (Tab 30) can readily be cut and formed with common household items such as scissors;

c) the polycarbonate plastic joining mechanism (Tab 30) is resistant to corrosion and is unaffected by most acids, bases, and industrial solvents;
d) the polycarbonate plastic joining mechanism (Tab 30) has a tremendous degree of flexibility, far in excess of that of a corresponding steel strip;
e) the polycarbonate plastic joining mechanism (Tab 30) can be bent through a large range of motion without permanently deforming;
f) the polycarbonate plastic joining mechanism (Tab 30) can deliberately be creased, and once creased, will hold the angle of the crease and preferentially bend at said crease;
g) the polycarbonate plastic joining mechanism (Tab 30) is inexpensive and easy to manufacture;
h) the polycarbonate plastic joining mechanism (Tab 30) is minimalist, requiring only a slot to fit into in order to effect a join;
i) the polycarbonate plastic joining mechanism (Tab 30) is less affected by dirt or grit than the piano wire and aluminum tubing mechanism well-known to the Prior Art;
j) the polycarbonate plastic joining mechanism (Tab 30) can be cut into short lengths without adversely affecting its flexibility;
k) the polycarbonate plastic joining mechanism (Tab 30) does not have a sharp edge that would pose a safety hazard;
l) the polycarbonate plastic joining mechanism (Tab 30) does not have a sharp point that can puncture the skin;
m) the polycarbonate plastic joining mechanism (Tab 30) provides a degree of lateral stability that is not provided by a joining means having a round cross-section (such as the piano wire and aluminum tubing mechanism mentioned above);
n) the polycarbonate plastic joining mechanism (Tab 30) can be made to fit more firmly into the slot if an incision roughly ⅛" long is cut into the end of the strip at its midpoint, parallel to the length of the strip;
o) the polycarbonate plastic joining mechanism (Tab 30), if not permanently fixed in place (e.g., by gluing it in place), accommodates disassembly;
p) the polycarbonate plastic joining mechanism (Tab 30) can readily be permanently fixed in place (e.g., by gluing it into place), thus permanently joining two objects;
q) the polycarbonate plastic joining mechanism (Tab 30) is easy to create and to replace;
r) the polycarbonate plastic joining mechanism (Tab 30) is transparent;
s) the polycarbonate plastic joining mechanism (Tab 30) facilitates the assembly of Platonic or Archimedean solids from component regular polygons;
t) the polycarbonate plastic joining mechanism (Tab 30) allows the two joined objects to easily be adjusted relative to each other;
u) the polycarbonate plastic joining mechanism (Tab 30) is strong and durable;
v) the strength of the join provided by the polycarbonate plastic joining mechanism (Tab 30) can readily be augmented (e.g., through the use of Velcro hook and loop) should the need arise.

CONCLUSION, RAMIFICATION, AND SCOPE

Accordingly, the reader will see that the lightweight joining mechanism (Tab 30) described above addresses many deficiencies of the Prior Art. Polycarbonate plastic is much easier to cut and form than steel and lacks the knife-edge that a corresponding steel strip with the desired flexibility would have. Polycarbonate plastic does not rust or corrode. Polycarbonate plastic can be cut using regular scissors. Polycarbonate plastic is more flexible than steel, and can be bent through a greater range of movement without permanently deforming. Polycarbonate plastic can be creased, and will hold the angle of the initial crease and preferentially bend at this crease. Polycarbonate plastic is transparent, and will not obstruct a viewport. A polycarbonate plastic joining mechanism (Tab 30) allows two joined objects to be easily adjusted relative to each other.

A polycarbonate plastic joining mechanism (Tab 30) allows Platonic and Archimedean solids to readily be assembled from component regular polygons. By making a small incision in the end of a joining mechanism (Tab 30), parallel to its length, the firmness with which the polycarbonate plastic joining mechanism (Tab 30) is held in place can be readily increased.

A polycarbonate plastic strip (Tab 30) can be held in place by a press fit, allowing the joined objects to be disassembled later; or it can be glued or otherwise cemented into place, permanently joining the two objects. Play in the system tends to be cumulative, and a Tab 30 can be cemented into place, thus providing a more secure join than one that is simply held in place by press fit; however, this comes at the cost of being able to disassemble the joined objects. If the number of objects joined together is large enough to make accumulated play an issue, applying a tensioning means such as a rubber band could potentially solve the problem. The tensioning means applies pressure to the linked objects, which allows the innate springiness of the Tabs 30 to effectively stabilize the system. Rubber bands can be difficult to use and are subject to slipping and rotting; therefore, the Velcro approach detailed below is preferred.

Should Tabs 30 fail to hold the Objects 10 securely enough, they can be supplemented with an additional supporting means such as Velcro. This effectively converts a primarily joining or connecting means into a fastening means. In this case, Tabs 30 initially provide a supportive framework that holds Objects 10 in their desired respective positions. Velcro loop 60 and hook 70 is then applied to hold Objects 10 firmly in their respective positions, locking them into this relationship. Following the application of the Velcro loop 60 and hook 70, the structural demands on Tabs 30 is vastly reduced (once applied, it is the Velcro hook 70 and loop 60 holding the objects together rather than Tabs 30 per se, but Tabs 30 still act to keep the sides of the polygons aligned along a crisp line, forming an edge). The presence of Tabs 30 serves to hold the polyhedron together during assembly, preventing the faces from shifting or shearing while the Velcro is being applied, and helping to prevent the completed polyhedron from collapsing or slumping once it has been assembled. Tabs 30 also serve to hold the polyhedron together during disassembly, preventing polygons from falling off of the polyhedron and providing a measure of cohesion.

It is not strictly necessary to use Velcro hook 70 and loop 60 to provide additional structural support; a variety of alternative materials could be used in its stead. For example, instead of using Velcro hook 70 and loop 60, one could use tape or even Post-Its. Post-Its are designed such that they hold fairly firmly yet can easily be removed, and could perform adequately providing that the surfaces they are applied to are clean enough for them to adhere to. If magnets were to be attached to the edges of the component polygons, they might serve to hold a polyhedron together, although the orientation of the magnets could prove to be a problem (the poles of the respective magnets would have to attract each other).

The complement of Tab 30 is a simple slot: Tab 30 is the male portion of the mechanism, while the slot is the female portion of the mechanism. Tab 30, in conjunction with a slot that it fits into, represents a minimal and efficient joining mechanism. A slot should be roughly 0.002" to 0.015" greater than the thickness of Tab 30, and deep enough to hold Tab 30 fairly securely (a good rule of thumb is to make the depth of the slot approximately half the length of Tab 30, but depending on the application, this ratio could vary considerably). Should stability beyond that provided by Tab 30 be desirable, adjuncts such as Velcro hook 70 and loop 60, tape, or a cementing means can be used in conjunction with the polycarbonate plastic joining mechanism to provide the desired firmness or rigidity, although the use of a cementing means could preclude a polyhedron from being easily disassembled.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

DEFINITIONS (In the claims section, please use the following definitions.)

Definition 1, "edge." The Prior Art concerns itself with three-dimensional polyhedra; thus the term, "edge" has consistently been used in the specification to denote "a line or line segment that is the intersection of two plane faces (as of a pyramid) or of two planes" [Merriam Webster's Collegiate Dictionary, 10th Edition]. However, the claims are concerned with two-dimensional polygons that can be used to construct three-dimensional polyhedra—therefore, "edge" is used in the claims in its more ordinary two-dimensional sense of "any of the narrow surfaces of a thin, flat object" [The Random House College Dictionary, Revised Edition, 1984].

Definition 2, "'one-way' mirror and 'two-way' mirror." "One-way" mirror is always opaque regardless of lighting conditions, whereas "two-way" mirror can vary from opaque (i.e., fully reflective) to transparent, depending on the lighting conditions.

Definition 3, "thin-walled material." The term, "thin-walled material," denotes an object in which the area defined by the largest surface of the object is many times greater than the area defined by its cross-section. In the case of a polygon, the area of its face would be many times greater than the area of its edge.

I claim:

1. A closed convex polyhedron comprising:
   a plurality of polygonal members each having the same shape and size, each of the plurality of polygonal members comprising:
   a regular polygonal-shaped planar body having equal length sides with a squared vertex between each pair of adjacent sides and opposing interior and exterior planar faces,
   the interior face of the polygonal member having a mirrored surface, and
   the exterior face comprising a plurality of channel members, each channel member disposed adjacent a midpoint of each respective side of the polygonal member and defining a slot opening toward the respective side;
   a plurality of flexible elongate joining tabs each having opposing ends;
   a plurality of elongate supporting means each having opposing ends; and
   an internal light source within an interior of the polyhedron for producing internal reflections between the mirrored surfaces of the polygonal members;
   the plurality of polygonal members being joined such that each side of each polygonal member is aligned with and abutted against a respective side of a respective adjacent polygonal member such that the midpoints of the abutting sides of the adjacent polygonal members are aligned to form an edge of the polyhedron, each polygonal member defining a face of the closed convex polyhedron with a dihedral angle formed between each pair of adjacent polygonal members;
   one of the plurality of joining tabs being received within a respective pair of adjacent slots adjacent each pair of abutting sides of adjacent polygonal members such that an end of the joining tab is removably inserted into each respective adjacent slot to enable disassembly of the polyhedron and the joining tabs resiliently bend to adjustably hold the dihedral angle between the adjacent polygonal members;
   one of the plurality of supporting means being removably attached to respective pair of adjacent exterior faces adjacent each pair of abutting sides of adjacent polygonal members such that an end of the supporting means is removably attached to each respective adjacent exterior face to maintain alignment and a desired dihedral angle between the adjacent polygonal members;
   one of the plurality of polygonal members comprising a two-way mirror having a transparent exterior face forming a viewport for viewing the internal reflections within the interior of the polyhedron;
   the remaining plurality of polygonal members comprising a one-way mirror having an opaque exterior face producing infinite internal reflections between the mirrored surfaces of the polygonal members.

2. The polyhedron of claim 1, wherein the plurality of joining tabs are made of polycarbonate plastic.

3. The polyhedron of claim 1, wherein the plurality of supporting means comprise interlocking hook and loop strips.

4. A closed convex polyhedron comprising:
   a plurality of polygonal members each having the same shape and size, each of the plurality of polygonal members comprising:
   a regular polygonal-shaped planar body having equal length sides with a rounded vertex between each pair of adjacent sides and opposing interior and exterior planar faces,
   the interior face of the polygonal member having a mirrored surface, and
   the exterior face comprising a plurality of channel members, each channel member disposed adjacent a midpoint of each respective side of the polygonal member and defining a slot opening toward the respective side;
   a plurality of flexible elongate joining tabs each having opposing ends; and
   a plurality of elongate supporting means each having opposing ends;
   the plurality of polygonal members being joined such that each side of each polygonal member is aligned with and abutted against a respective side of a respective adjacent polygonal member such that the midpoints of the abutting sides of the adjacent polygonal members are aligned to form an edge of the polyhedron, each polygonal member defining a face of the closed convex polyhedron with a dihedral angle formed between each pair of adjacent polygonal members;

adjacent rounded vertexes of adjacent polygonal members forming a gap at opposing ends of each edge of the polyhedron allowing external light within an interior of the polyhedron for producing internal reflections between the mirrored surfaces of the polygonal members;

one of the plurality of joining tabs being received within respective pairs of adjacent slots adjacent each pair of abutting sides of adjacent polygonal members such that an end of the joining tab is removably inserted into each respective adjacent slot to enable disassembly of the polyhedron and the joining tabs resiliently bend to adjustably hold the dihedral angle between the adjacent polygonal members;

one of the plurality of supporting means being removably attached to respective pairs of adjacent exterior faces adjacent each pair of abutting sides adjacent polygonal members such that an end of the supporting means is removably attached to each respective adjacent exterior face to maintain alignment and a desired dihedral angle between the adjacent polygonal members;

one of the plurality of polygonal members comprising a two-way mirror having a transparent exterior face forming a viewport for viewing the internal reflections within the interior of the polyhedron;

the remaining plurality of polygonal members comprising a one-way mirror having an opaque exterior face producing infinite internal reflections between the mirrored surfaces of the polygonal members.

5. The polyhedron of claim 4, wherein the plurality of joining tabs are made of polycarbonate plastic.

6. The polyhedron of claim 4, wherein the plurality of supporting means comprise interlocking hook and loop strips.

\* \* \* \* \*